United States Patent
Yamaguchi (10) Patent No.: US 10,029,574 B2
(45) Date of Patent: Jul. 24, 2018

(54) CHARGING CABLE FOR VEHICLE

(71) Applicant: DENSO CORPORATION, Kariya, Aichi-pref. (JP)

(72) Inventor: Kazuhiko Yamaguchi, Gifu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 400 days.

(21) Appl. No.: 14/513,323

(22) Filed: Oct. 14, 2014

(65) Prior Publication Data

US 2015/0108946 A1 Apr. 23, 2015

(30) Foreign Application Priority Data

Oct. 23, 2013 (JP) .................... 2013-220201

(51) Int. Cl.
*B60L 11/18* (2006.01)

(52) U.S. Cl.
CPC ....... *B60L 11/1816* (2013.01); *B60L 11/1846* (2013.01); *B60L 2230/12* (2013.01); *B60L 2250/10* (2013.01); *B60L 2250/20* (2013.01); *B60L 2270/34* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC ................................................ B60L 11/1816
USPC ........................................................ 320/109
See application file for complete search history.

(56) References Cited

U.S. PATENT DOCUMENTS 8,653,788 B2 * 2/2014 Masuda ............. H01R 13/7035
 320/109
8,669,740 B2 * 3/2014 Kawashima .......... H01M 10/44
 180/65.1

(Continued)

FOREIGN PATENT DOCUMENTS

JP 2010-161911 7/2010
JP 2011-015529 1/2011

(Continued)

OTHER PUBLICATIONS

Office Action dated Aug. 4, 2015 in corresponding Japanese Application No. 2013-220201 with translation.

*Primary Examiner* — Samuel Berhanu
*Assistant Examiner* — Tessema Kebede
(74) *Attorney, Agent, or Firm* — Harness, Dickey & Pierce, P.L.C.

(57) ABSTRACT

A charging cable to charge an electric power storage device mounted on a vehicle with electric power from an external power source includes a switcher that switches the charging cable between a charging enable state where a charging of the electric power storage device is enabled and a charging disable state where the charging of the electric power storage device is disabled, a connection plug to be connected to the external power source, and a connection determinator that determines whether a connection state between the connection plug and the external power source changes between a conduction state and a non-conduction state. The switcher puts the charging cable into the charging enable state in accordance with a command from a user. The switcher puts the charging cable into the charging disable state when the connection state changes.

18 Claims, 6 Drawing Sheets

(56) References Cited

U.S. PATENT DOCUMENTS

| | | | | |
|---|---|---|---|---|
| 2010/0079105 A1* | 4/2010 | Iwanaga | ................ | B60K 6/445 320/109 |
| 2012/0091958 A1* | 4/2012 | Ichikawa | .............. | B60L 3/0046 320/109 |
| 2012/0140752 A1* | 6/2012 | Yun | ..................... | B60L 11/1846 370/338 |
| 2014/0361748 A1* | 12/2014 | Charbiwala | ............... | H02J 7/34 320/134 |

FOREIGN PATENT DOCUMENTS

| JP | 2013-198279 | * | 3/2013 |
|---|---|---|---|
| JP | 5174296 | | 4/2013 |

\* cited by examiner

CHARGING CABLE FOR VEHICLE

CROSS REFERENCE TO RELATED APPLICATION

This application is based on and claims priority to Japanese Patent Application No. 2013-220201 filed on Oct. 23, 2013, the contents of which are incorporated herein by reference.

FIELD

The present invention relates to a charging cable for charging an electric power storage device mounted on a vehicle with electric power from an external power source.

BACKGROUND

JP-A-2011-15529 discloses a charging cable used to charge a battery mounted on a vehicle. The charging cable has a function to perform a user authentication. The charging of the battery is enabled only when the user authentication succeeds. Thus, the user authentication function prevents others who don't have authority to use the charging cable from using the charging cable.

In JP-A-2011-15529, the charging of the battery is performed by connecting a connector of the charging cable to an inlet of the vehicle. Once the connector is disconnected from the inlet, the charging cable is put into a charging disable state where the charging of the battery is disabled. The charging cable is kept in the charging disable state until the user authentication succeeds again.

Therefore, even in a situation where the charging cable is less likely to be stolen, a user is required to perform the user authentication each time the charging of the battery is performed. In this way, the charging cable disclosed in JP-A-2011-15529 requires a user to do troublesome procedures to charge the battery and therefore may be inconvenient for a user.

SUMMARY

In view of the above, it is an object of the present disclosure to provide a charging cable which is convenient for a user and less likely to be stolen by others.

According to an aspect of the present disclosure, a charging cable is detachably connected to a vehicle and an external power source to charge an electric power storage device mounted on the vehicle with electric power from the external power source.

The charging cable includes a switcher, a connection plug, and a connection determinator. The switcher switches the charging cable between a charging enable state where a charging of the electric power storage device is enabled and a charging disable state where the charging of the electric power storage device is disabled. The connection plug is detachably connected to the external power source. The connection determinator determines whether a connection state between the connection plug and the external power source changes between a conduction state and a non-conduction state.

The switcher puts the charging cable into the charging enable state in accordance with a command from a user who has authority to use the charging cable. The switcher puts the charging cable into the charging disable state upon determination of the connection determinator that the connection state changes from one of the conduction state and the non-conduction state to the other of the conduction state and the non-conduction state.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure are described below with reference to the drawings in which like characters of reference indicate the same or equivalent parts.

First Embodiment

A charging cable 3 according to a first embodiment of the present embodiment is described below with reference to FIGS. 1-3. The charging cable 3 is used to change an assembled battery 11 mounted on an electric vehicle 1 with electric power from an external power source 5 such as a commercial AC power source of 200V. The electric vehicle 1 is capable of running on electric power of the assembled battery 11.

Figure 1:
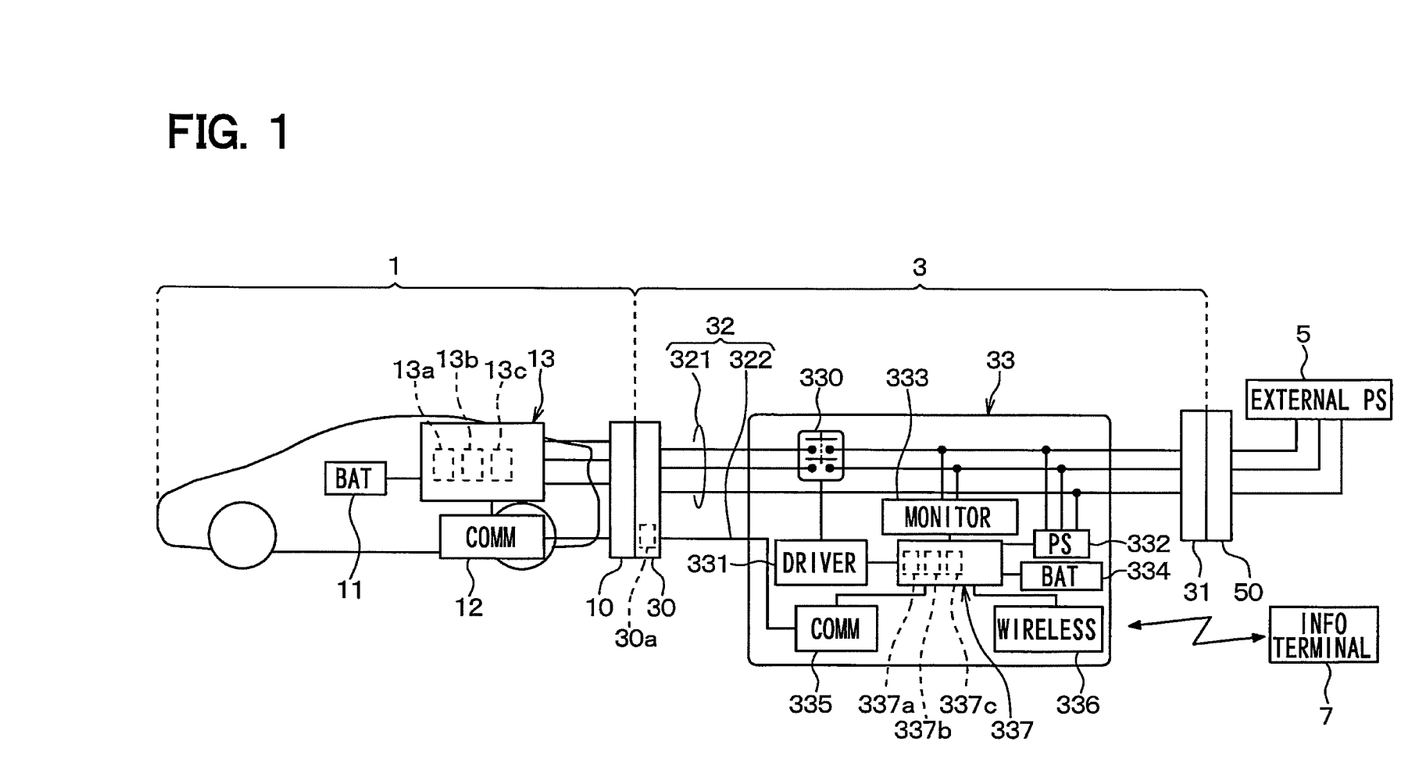
FIG. 1 is a diagram illustrating a vehicle charging system using a charging cable according to a first embodiment of the present disclosure.

As shown in FIG. 1, the electric vehicle 1 includes an inlet 10 for receiving a charging connector of the charging cable 3, the assembled battery 11, a communication unit 12, and a control unit 13. Although not shown in the drawings, the electric vehicle 1 further includes a driving unit such as a motor generator, a motor driving apparatus, etc.

The assembled battery 11 is an electric power storage device capable of storing (i.e., capable of being charged with) electric power from the external power source 5. For example, the assembled battery 11 can be formed with secondary battery cells such as lithium-ion cells and nickel-hydride cells and/or electric power storage elements such as electric double-layer capacitors. The assembled battery 11 supplies electric power to the driving unit so that the driving unit can generate driving force to run the electric vehicle 1 using the supplied electric power. Further, the assembled battery 11 stores electric power regenerated by the motor generator and/or electric power supplied from the external power source 5.

The communication unit 12 exchanges signals with an external communication device (not shown) and exchanges signals with the charging cable 3 through the inlet 10.

The communication unit 12 is connected to the control unit 13. The communication unit 12 receives signals from the external communication device and the charging cable 3 and transmits the received signals to the control circuit 13.

Also, the communication unit 12 receives signals from the control unit 13 and transmits the received signals to the external communication device and the charging cable 3.

The control unit 13 controls power supply to the assembled battery 11 and also controls power supply from the assembled battery 11 to the driving unit. The control unit 13 includes a motor controller 13a, a power converter 13b for converting AC power to DC power, and a vehicle controller 13c.

The vehicle controller 13c includes a microcomputer and its peripheral circuit. The microcomputer has a CPU and a memory. The vehicle controller 13c performs a control process to control devices mounted on the electric vehicle 1 based on signals from the communication unit 12 and sensors mounted on the electric vehicle 1. The control process performed by the vehicle controller 13c can be implemented by either software or special hardware.

The vehicle controller 13c is connected to the inlet 10, the assembled battery 11, and the communication unit 12 and receives a physical quantity signal indicative of a charging/discharging state (e.g., SOC) of the assembled battery 11, a connection signal indicative of a connection state between the inlet 10 and the charging connector 30, and signals from the communication units 12.

Further, the vehicle controller 13c performs various calculations and processes based on signals inputted from various devices. Specifically, the vehicle controller 13c outputs a charging start signal to the charging cable 3 based on the physical quantity signal from the assembled battery 11 and a pilot signal from the communication unit 12.

The pilot signal is transmitted from a control section 337 of the charging cable 3 to the vehicle controller 13c to notify the vehicle controller 13c that a charging start condition is met. Further, based on the potential of the pilot signal operated in the vehicle controller 13c, the pilot signal can be also used as a signal (i.e., the charging start signal) for remote control from the vehicle controller 13c.

Next, the charging cable 3 is described in details. The charging cable 3 is used to charge the assembled battery 11 mounted on the electric vehicle 1 with electric power from the external power source 5. The charging cable 3 includes the charging connector 30 to be connected with the inlet 10 of the electric vehicle 1, a connection plug 31 to be connected to the external power source 5, a connection cable 32, and a charging control unit 33.

The charging connector 30 supplies electric power through the inlet 10 of the electric vehicle 1 and can be detachably connected to the inlet 10. The charging connector 30 has a connection detection circuit 30a for detecting whether the charging connector 30 and the inlet 10 are in a conduction state or a non-conduction state. When the charging connector 30 and the inlet 10 are in a conduction state, the connection detection circuit 30a outputs a conduction signal to the charging control unit 33. For example, the connection detection circuit 30a can detect whether the charging connector 30 and the inlet 10 are in a conduction state or a non-conduction state based on a change in potential of the charging connector 30 appearing when the charging connector 30 and the inlet 10 are in a conduction state.

The connection plug 31 is used to receive electric power from the external power source 5 through a receptacle outlet 50 of the external power source 5. The connection plug 31 can be detachably connected to the receptacle outlet 50. That is, since the charging cable 3 has both the charging connector 30 and the connection plug 31, the charging cable 3 can be detachably connected to both the electric vehicle 1 and the external power source 5.

The connection cable 32 connects the charging connector 30 and the connection plug 31 and provides an electrical path between the electric vehicle 1 and the external power source 5. The connection cable 32 includes a power line 321 for power supply and a signal line 322 for communication.

The charging control unit 33 is placed somewhere in the middle of the connection cable. 32 and controls power supply from the external power source 5 to the electric vehicle 1. The charging control unit 33 includes a relay 330, a relay driver 331, a power supply section 332, a power supply monitor 333, a battery 334, a communication unit 335, a wireless communication module 336, and a control section 337.

The relay 330 is provided in the power line 321 of the connection cable 32 and serves as a switch for switching a connection state between the electric vehicle 1 and the external power supply 5 between a conduction state and a non-conduction (i.e., interruption) state.

When the relay 330 is turned OFF, the connection state between the electric vehicle 1 and the external power supply 5 becomes a non-conduction state so that power supply from the external, power source 5 to the electric vehicle 1 can be interrupted. In contrast, when the relay 330 is turned ON, the connection state between the electric vehicle 1 and the external power supply 5 becomes a conduction state so that electric power can be supplied from the external power source 5 to the electric vehicle 1.

The relay driver 331 is a driving circuit to drive the relay 330. The relay driver 331 turns ON and OFF the relay 330 in accordance with a control signal from the control section 337.

The power supply section 332 is a conversion circuit to convert electric power supplied from the external power source 5 to electric power suitable for the devices of the charging control unit 33. The power supply section 332 is basically powered by using electric power supplied from the external power source 5.

The power supply monitor 333 is a monitor circuit provided between the connection plug 31 and the relay 330 to monitor a supply voltage supplied between the connection plug 31 and the relay 330 from the external power source 5. The power supply monitor 333 outputs a monitor signal indicative of the monitored voltage to the control section 337.

The battery. 334 supplies electric power to the devices of the charging control unit 33 under conditions where electric power from the external power source 5 is unavailable, such as when the connection plug 31 is disconnected from the receptacle outlet 50. The battery 334 corresponds to an auxiliary power storage device recited in claims.

The communication unit 335 is connected to the signal line 322 to exchange signals with mainly the communication unit 12 of the electric vehicle 1. The communication unit 335 is connected to the control section 337. The communication unit 335 receives signals from the control unit 13 and transmits the received signals to the control section 337. Also, the communication unit 335 receives signals from the control section 337 and transmits the received signals to the control unit 13.

The wireless communication module 336 exchanges signals with mainly an information terminal 7. The wireless communication module 336 is connected to the control section 337. The wireless communication module 336 receives signals (information) from the information terminal 7 and transmits the received signals to the information terminal 7. Also, the wireless communication module 336 receives signals from the control section 337 and transmits the received signals to the information terminal 7.

The information terminal 7 is operated by a user. The wireless communication module 336 corresponds to an information receiver, recited in claims, to receive various information (state switching information, user identifying information) transmitted from the information terminal 7.

Examples of the information terminal 7 can include a mobile phone or terminal capable of performing wireless communication, a personal computer placed in a home, etc. The information terminal 7 is capable of transmitting at least state switching information and user identifying information to the wireless communication module 336 of the charging cable 3.

The user identifying information transmitted by the information terminal 7 indicates a user who has authority to use the charging cable 3 and may be an owner of the charging cable 3. A user can transmit the user identifying information, including identification information (ID) to identify a user itself and a personal identification number (PIN) associated with the ID, by operating the information terminal 7.

The state switching information transmitted by the information terminal 7 indicates whether a charging of the assembled battery 11 which is performed through the charging cable 3 is enabled or disabled. A user can transmit the state switching information, including enable information to enable the charging of the assembled battery 11 and disable information to disable the charging of the assembled battery 11, by operating the information terminal 7.

The control section 337 includes a microcomputer and its peripheral circuit. The microcomputer has a CPU and a memory. The control section 337 controls the charging of the assembled battery 11, which is performed with electric power from the external power source 5, based on signals from the devices of the charging cable 3.

The connection detection circuit 30a of the charging connector 30, the power supply monitor 333, the communication unit 335, and the wireless communication module 336 are connected to an input side of the control section 337 so that signals from these devices can be inputted to the control section 337.

The control section 337 performs a charging process to control the charging of the assembled battery 11, which is performed with electric power from the external power source 5, based on the signals inputted from the devices connected to its input side. The charging process performed by the control section 337 can be implemented by either software or special hardware.

When the charging start condition is met, the control section 337 outputs the pilot signal indicating that the charging start condition is met to the vehicle controller 13c through the communication unit 335. When receiving the pilot signal indicating that the charging start condition is met from the vehicle controller 13c, the vehicle controller 13c outputs a turn-ON signal to the relay driver 331 in order to cause the relay driver 331 to turn ON the relay 330. Accordingly, the charging of the assembled battery 11 is started.

Further, the control section 337 determines whether a connection state between the connection plug 31 and the receptacle outlet 50 of the external power source 5 changes from a conduction state to a non-conduction state. Specifically, the control section 337 determines whether a connection state between the connection plug 31 and the external power source 5 changes from a conduction state to a non-conduction state based on the monitor signal from the power supply monitor 333. As mentioned previously, the monitor signal indicates the supply voltage between the connection plug 31 and the relay 330.

When the connection state between the connection plug 31 and the external power source 5 changes from a conduction state to a non-conduction state, power supply from the external power source is interrupted, so that the supply voltage between the connection plug 31 and the relay 330 becomes almost zero. Therefore, when the monitor signal received from the power supply monitor 333 indicates that the supply voltage becomes almost zero, the control section 337 determines that the connection state between the connection plug 31 and the external power source 5 changes from a conduction state to a non-conduction state.

That is, the control section 337 has a connection determinator 337a to determine whether the connection state between the connection plug 31 and the external power source 5 changes from a conduction state to a non-conduction state. The connection determinator 337a can be implemented by either software or special hardware.

The control section 337 performs user authentication by checking the user identifying information (ID, PIN), which is received from the information terminal 7 through the wireless communication module 336, against user identifying information (ID, PIN) prestored in the memory of the control section 337. The user identifying information (ID, PIN), which is received from the information terminal 7 through the wireless communication module 336, is hereinafter sometimes referred to as the "received user identifying information". The user identifying information (ID, PIN) prestored in the memory of the control section 337 is hereinafter sometimes referred to as the "prestored user identifying information".

For example, the control section 337 determines whether the ID and the PIN of the received user identifying information match with the ID and the PIN of the prestored user identifying information, respectively. If the received user identifying information matches with, the prestored user identifying information in both the ID and the PIN, the control section 337 sets an authentication flag to indicate that the user authentication succeeds. In contrast, if the received user identifying information does not match with the prestored user identifying information in both the ID and the PIN, the control section 337 resets the authentication flag to indicate that the user authentication fails. In other words, if the received user identifying information matches with the prestored user identifying information in only one or neither of the ID and the PIN, the control section 337 resets the authentication flag.

That is, the control section 337 has an authenticator 337b to perform an authentication of the user identifying information, thereby performing the user authentication. The authenticator 337b can be implemented by either software or special hardware.

Further, the control section 337 restricts a function of the charging cable 3 based on not only the connection state between the connection plug 31 and the external power source 5 but also the information transmitted from the information terminal 7. That is, the control section 337 can switch the charging cable 3 between a charging enable state where the charging of the assembled battery 11 is enabled and a charging disable state where the charging of the assembled battery 11 is disabled based on not only the connection state between the connection plug 31 and the external power source 5 but also the information transmitted from the information terminal 7. Specifically, the control section 337 switches the charging cable 3 from the charging disable state to the charging enable state according to a command inputted by a user having authorization to use the charging cable 3. According to the first embodiment, the command is the state switching information inputted through the information terminal 7.

The charging enable state is a condition where the control section 337 is enabled to control the relay 330 through the relay driver 331. In contrast, the charging disable state is a condition where the relay 330 is kept OFF while the control section 337 is disabled to control the relay 330 through the relay driver 331.

That is, the control section 337 has a switcher 337c to switch the charging cable 3 between the charging enable state and the charging disable state.

Next, a charging start process performed by the control section 337 of the charging cable 3 to start the charging of the assembled battery 11 is described with reference to a flowchart of FIG. 2. The control section 337 performs the charging start process periodically or in response to a command from the electric vehicle 1 when the electric vehicle 1 remains parked. In a case where the control section 337 remains connected to the external power supply 5, the control section 337 performs the charging start process by using electric power supplied from the external power supply 5. In another case where the control section 337 remains disconnected from the external power supply 5, the control section 337 performs the charging start process by using electric power supplied from the battery 334.

Figure 2:
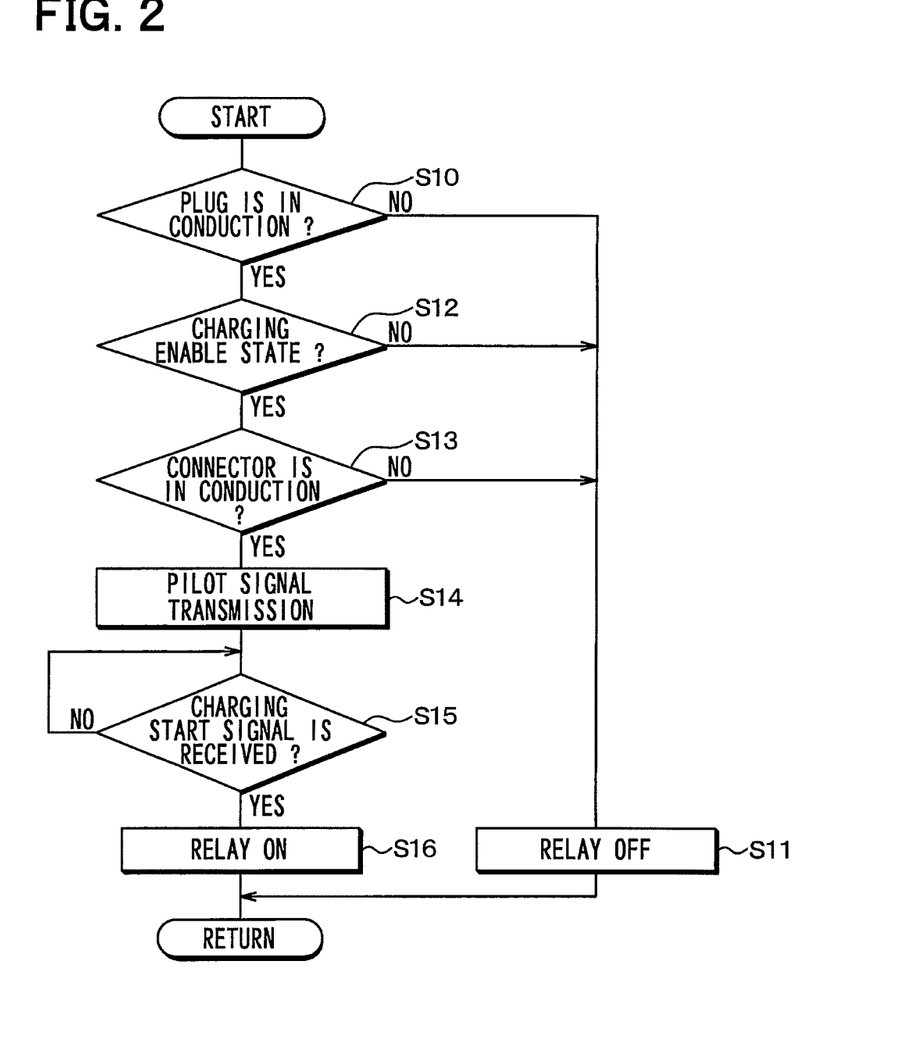
FIG. 2 is a flowchart of a charging start process according to the first embodiment.

As shown in FIG. 2, the charging start process starts at S10 where the control section 337 determines whether the connection plug 31 is connected to the receptacle outlet 50 of the external power source 5 so that the connection state between the connection plug 31 and the external power source 5 can be in a conduction state. Specifically, at S10, the control section 337 determines whether the monitor signal inputted from the power supply monitor 333 indicates that power supply from the external power source 5 is not interrupted (e.g., the supply voltage is not zero).

If the connection state between the connection plug 31 and the external power source 5 is in a non-conduction state corresponding to NO at S10, the charging start process proceeds to S11 where the control section 337 turns OFF the relay 330 through the relay driver 331.

In contrast, if the connection state between the connection plug 31 and the external power source 5 is in a conduction state corresponding to YES at S10, the charging start process proceeds to S12 where the control section 337 determines whether the function of the charging cable 3 remains unrestricted.

Specifically, at S12, the control section 337 determines whether the charging cable 3 is in the charging enable state. This determination procedure at S12 is performed based on a result of a function restriction process to determine whether the function of the charging cable 3 needs to be restricted. The function restriction process is performed by the control section 337 separately from the charging start process.

The function restriction process is described below with reference to a flowchart of FIG. 3. The control section 337 performs the function restriction process periodically or in response to a command from the electric vehicle 1 when the electric vehicle 1 remains parked.

Figure 3:
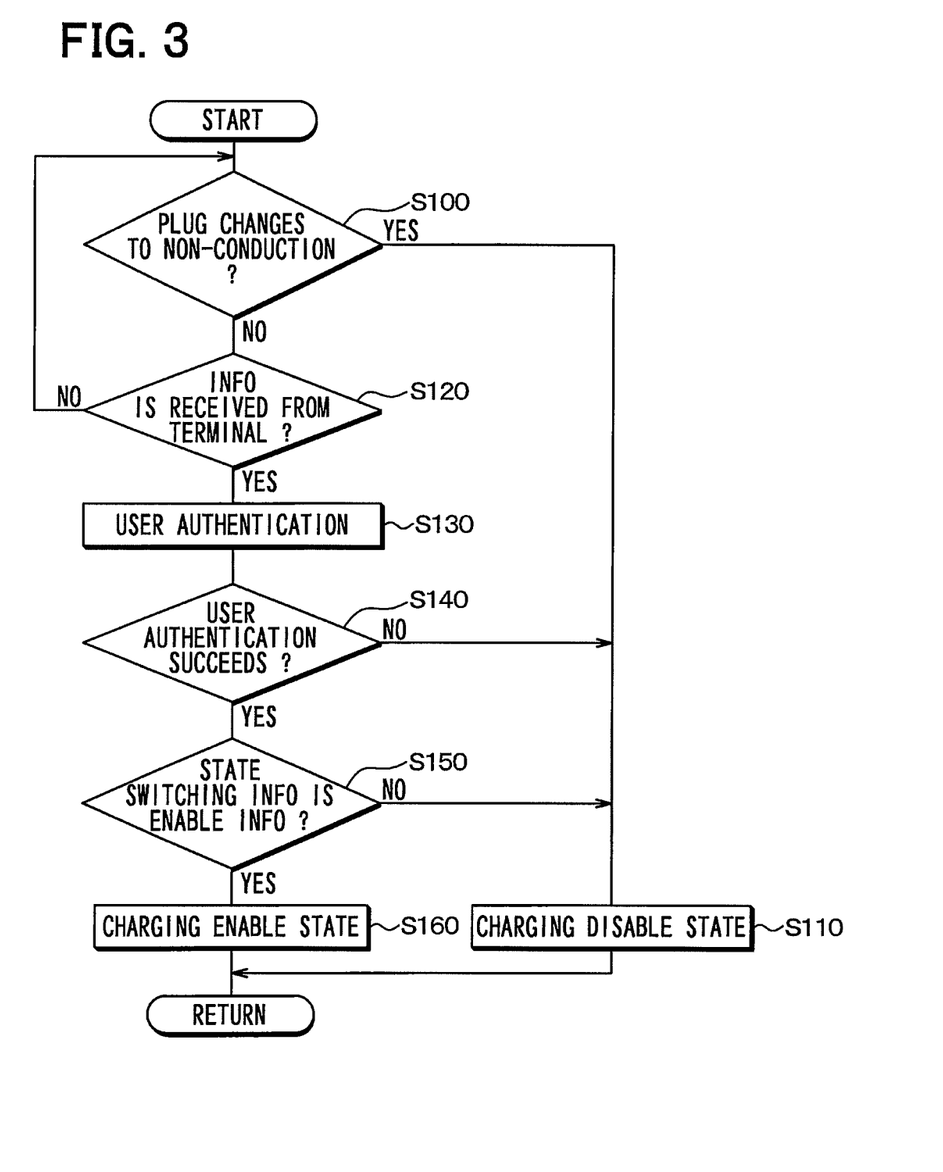
FIG. 3 is a flowchart of a function restriction process according to the first embodiment.

As shown in FIG. 3, the function restriction process starts at S100 where the control section 337 determines whether the connection state between the connection plug 31 and the external power source 5 changes from a conduction state to a non-conduction state. Specifically, at S100, the control section 337 determines whether the monitor signal inputted from the power supply monitor 333 indicates that power supply from the external power source 5 is interrupted.

In a situation where the connection plug 31 becomes disconnected from the receptacle outlet 50 of the external power source 5, there is a high possibility that the charging cable 3 is stolen by a person other than a user who has authority to use the charging cable 3 and may be an owner of the charging cable 3.

For this reason, if the control section 337 determines that the connection state between the connection plug 31 and the external power source 5 changes from a conduction state to a non-conduction state corresponding to YES at S100, the function restriction process proceeds to S110 where the control section 337 puts the charging cable 3 into the charging disable state to restrict the function of the charging cable 3. For example, at S110, the control section 337 resets a charge flag which is to be set when the function of the charging cable 3 is enabled. It is noted that power supply from the external power source 5 is interrupted after the connection state between the connection plug 31 and the external power source 5 changes from a conduction state to a non-conduction state. Therefore, the controller 337 continues the function restriction process by using electric power of the battery 334.

In contrast, if the control section 337 does not determine that the connection state between the connection plug 31 and the external power source 5 changes from a conduction state to a non-conduction state corresponding to NO at S100, the function restriction process proceeds to S120. At S120, the control section 337 determines whether the control section 337 receives the state switching information and the user identifying information from the information terminal 7.

If the control section 337 does not receive the state switching information and the user identifying information from the information terminal 7 corresponding to NO at S120, the function restriction process returns to S100. In contrast, if the control section 337 receives the state switching information and the user identifying information from the information terminal 7 corresponding to YES at S120, the function restriction process proceeds to S130 where the control section 337 performs the user authentication based on the user identifying information received from the information terminal 7.

Specifically, at S130, the control section 337 performs the user authentication by checking the user identifying information (ID, PIN) received from the information terminal 7 against the user identifying information (ID, PIN) prestored in the memory of the control section 337.

Then, the function restriction process proceeds to S140 where the control section 337 determines whether the user authentication succeeds or fails. If the user authentication fails corresponding to NO at S140, the control section 337 determines that the user authentication is performed unrightfully by others who don't have authority to use the charging cable 3, and the function restriction process proceeds to S110 where the control section 337 puts the charging cable 3 into the charging disable state.

In contrast, if the user authentication succeeds corresponding to YES at S140, the control section 337 determines that the user authentication is performed rightfully by a user who has authority to use the charging cable 3 and may be an owner of the charging cable 3, and the function restriction process proceeds to S150. At S150, the control section 337 determines whether the state switching information is the enable information to enable the charging of the assembled battery 11.

If the state switching information is the enable information corresponding to YES at S150, the function restriction process proceeds to S160 where the control section 337 puts the charging cable 3 into the charging enable state to unrestrict the function of the charging cable 3. For example, at S160, the control section 337 sets the charge flag which is to be set when the function of the charging cable. 3 is enabled.

In contrast, if the state switching information is the disable information corresponding to NO at S150, the function restriction process proceeds to S110 where the control section 337 puts the charging cable 3 into the charging disable state.

As described above, in the function restriction process according to the first embodiment, the charging cable 3 is put into the charging enable state only when both of the following conditions are met: the user authentication succeeds, and the state switching information is the enable information.

In contrast, the charging cable 3 is put into the charging disable state when at least one of the following conditions is met: the connection state between the connection plug 31 and the external power source 5 changes from a conduction state to a non-conduction state, the user authentication fails, and the state switching information is the disable information.

Returning to FIG. 2, if the control section 337 determines that the charging cable 3 is in the charging disable state corresponding to NO at S12, the charging start process proceeds to S11 where the control section 337 turns OFF the relay 330 through the relay driver 331. As a result, power supply to the assembled battery 11 from the external power source 5 using the charging cable 3 is disabled.

In contrast, if the control section 337 determines that the charging cable 3 is in the charging enable state corresponding to YES at S12, the charging start process proceeds to S13. At S13, the control section 337 determines whether the charging connector 30 and the inlet 10 of the electric vehicle 1 are in a conduction state based on the conduction signal from the connection detection circuit 30a of the charging connector 30.

If the control section 337 determines that the charging connector 30 and the inlet 10 of the electric vehicle 1 are in a non-conduction state corresponding to NO at S13, the charging start process proceeds to S11 where the control section 337 turns OFF the relay 330 through the relay driver 331.

In contrast, if the control section 337 determines that the charging connector 30 and the inlet 10 of the electric vehicle 1 are in a conduction state corresponding to YES at S13, the charging start process proceeds to S14 where the control section 337 outputs the pilot signal to the electric vehicle 1 to notify the vehicle controller 13c that the charging start condition is met.

Specifically, the pilot signal is an oscillation signal of a predetermined frequency and transmitted to the communication unit 12 of the electric vehicle 1 through the communication unit 335 of the charging cable 3. When receiving the pilot signal from the charging cable 3 through the communication unit 12, the vehicle controller 13c determines whether the charging of the assembled battery 11 is enabled based on the pilot signal and the physical quantity signal indicative of the charging/discharging state of the assembled battery 11. The vehicle controller 13c outputs the charging start signal to the charging cable 3 when determining that the charging of the assembled battery 11 is enabled.

After S14, the charging start process proceeds to S15 where the control section 337 determines whether the control section 337 receives the charging start signal from the electric vehicle 1.

If the control section 337 does not receive the charging start signal from the electric vehicle 1 corresponding to NO at S15, the control section 337 waits at S15 until receiving the charging start signal from the electric vehicle 1.

In contrast, if the control section 337 receives the charging start signal from the electric vehicle 1 corresponding to YES at S15, the charging start process proceeds to S16 where the control section 337 turns ON the relay 330 through the relay driver 331. As a result, power supply from the external power source 5 to the assembled battery 11 of the electric vehicle 1 is started so that the charging of the assembled battery 11 can be started.

As described above, according to the first embodiment, when the connection state between the connection plug 31 and the receptacle outlet 50 of the external power source 5 changes from a conduction state to a non-conduction state, the control section 337 puts the charging cable 3 into the charging disable state to restrict the function of the charging cable 3 so that the charging of the assembled battery 11 can be disabled.

In such an approach, even when the charging cable 3 is stolen by others, the charging cable 3 remains in the charging disable state so that others cannot use the function of the charging cable 3. That is, since it is hardly worth stealing the charging cable 3, others are deterred from stealing the charging cable 3.

Further, according to the first embodiment, when the connection state between the connection plug 31 and the external power source 5 changes from a conduction state to a non-conduction state, the charging cable 3 is automatically put into the charging disable state. In this way, the configuration according to the first embodiment does not require a user to do troublesome procedures to put the charging cable 3 into the charging disable state, compared to a configuration where the charging cable 3 is put into the charging disable state whenever the charging cable 3 is disconnected from the electric vehicle 1.

Thus, the charging cable 3 is convenient for a user and less likely to be stolen by others.

Further, a user can put the charging cable 3 into the charging enable state by performing the user authorization with the information terminal 7. A user can repeat the charging of the assembled battery 11 during a time period where the charging cable 3 remains in the charging enable state without performing the user authorization again.

Thus, the configuration according to the first embodiment does not require a user to do troublesome procedures to use the charging cable 3, compared to a conventional configuration that requires a user to perform a user authorization whenever charging the assembled battery 11. Therefore, the charging cable 3 offers more convenience to a user.

Further, a user can put the charging cable 3 into the charging disable state by performing the user authorization with the information terminal 7. Therefore, when there is no need to use the charging cable 3, a user can put the charging cable 3 into the charging disable state by operating the information terminal 7 in order to prevent the charging cable 3 from being unrightfully used by others.

Further, the battery 334 as an auxiliary power storage device is incorporated in the charging cable 3. Thus, a user can either restrict or unrestrict the function of the charging cable 3 using the information terminal 7 regardless of whether the connection plug 31 is connected to the receptacle outlet 50 of the external power source 5.

That is, a user can either restrict or unrestrict the function of the charging cable 3 using the information terminal 7 without checking the connection condition between the connection plug 31 and the receptacle outlet 50 of the external power source 5. Therefore, the charging cable 3 offers more convenience to a user.

Second Embodiment

A charging cable 3 according to a second embodiment of the present disclosure is described below with reference to FIGS. 4, 5, and 6. The second embodiment differs from the first embodiment in that the charging cable 3 does not have the battery 334 as an auxiliary power storage device.

Figure 4:
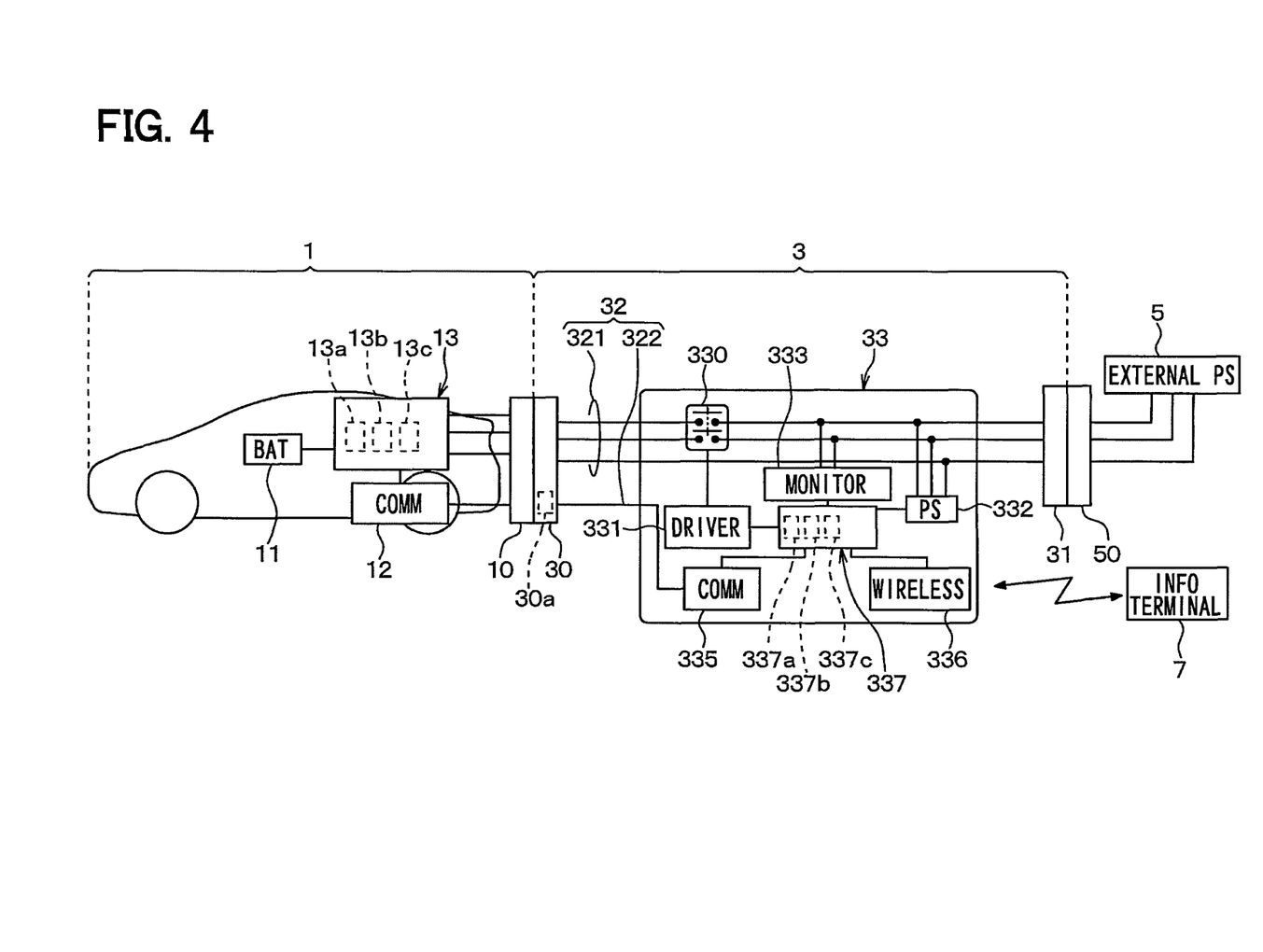
FIG. 4 is a diagram illustrating a vehicle charging system using a charging cable according to a second embodiment of the present disclosure.

As shown in FIG. 4, the charging cable 3 does not have the battery 334, and the devices of the charging cable 3 operates on electric power supplied from the external power source 5. The other configurations are the same as those in the first embodiment, so their description is omitted.

Next, a charging start process performed by the control section 337 of the charging cable 3 to start the charging of the assembled battery 11 is described with reference to a flowchart of FIG. 5. The control section 337 performs the charging start process periodically or in response to a command from a user when the charging cable 3 remains connected to the external power source 5. The control section 337 performs the charging start process by using electric power supplied from the external power supply 5.

Figure 5:
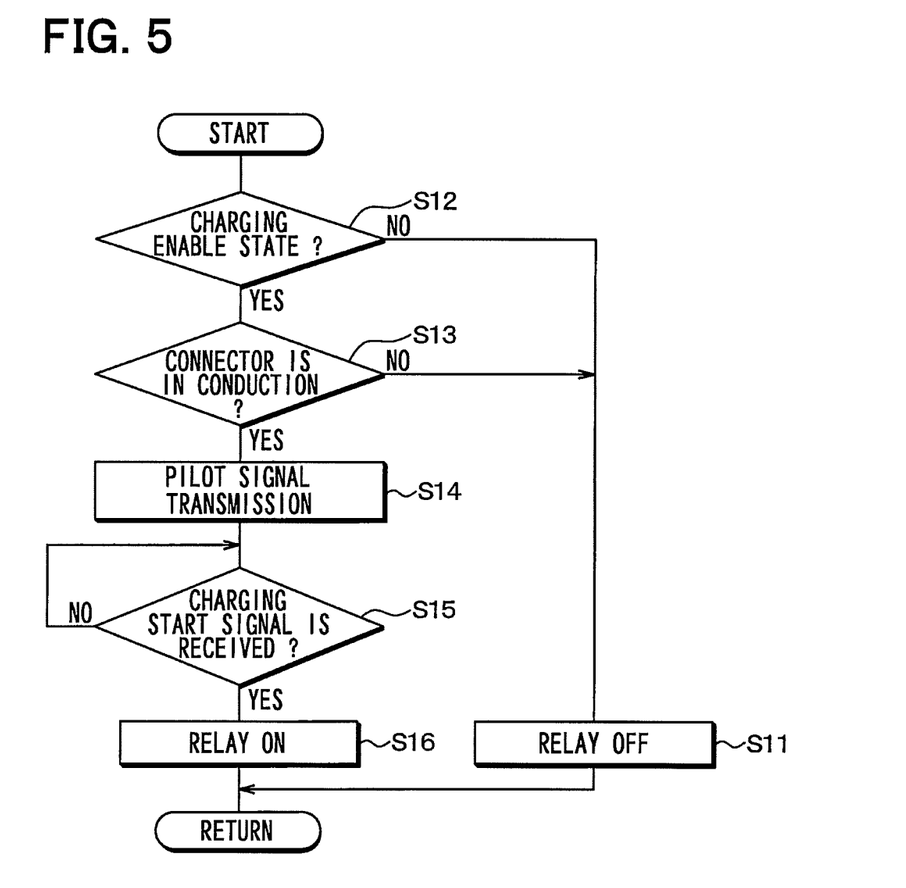
FIG. 5 is a flowchart of a charging start process according to the second embodiment.

As shown in FIG. 5, the charging start process starts at S12 where the control section 337 determines whether the function of the charging cable 3 remains unrestricted. Specifically, at S12, the control section 337 determines whether the charging cable 3 is in the charging enable state. This determination procedure at S12 is performed based on a result of a function restriction process to determine whether the function of the charging cable 3 needs to be restricted.

The function restriction process is described below with reference to a flowchart of FIG. 6. The control section 337 performs the function restriction process when the charging cable 3 is connected to the external power source 5.

Figure 6:
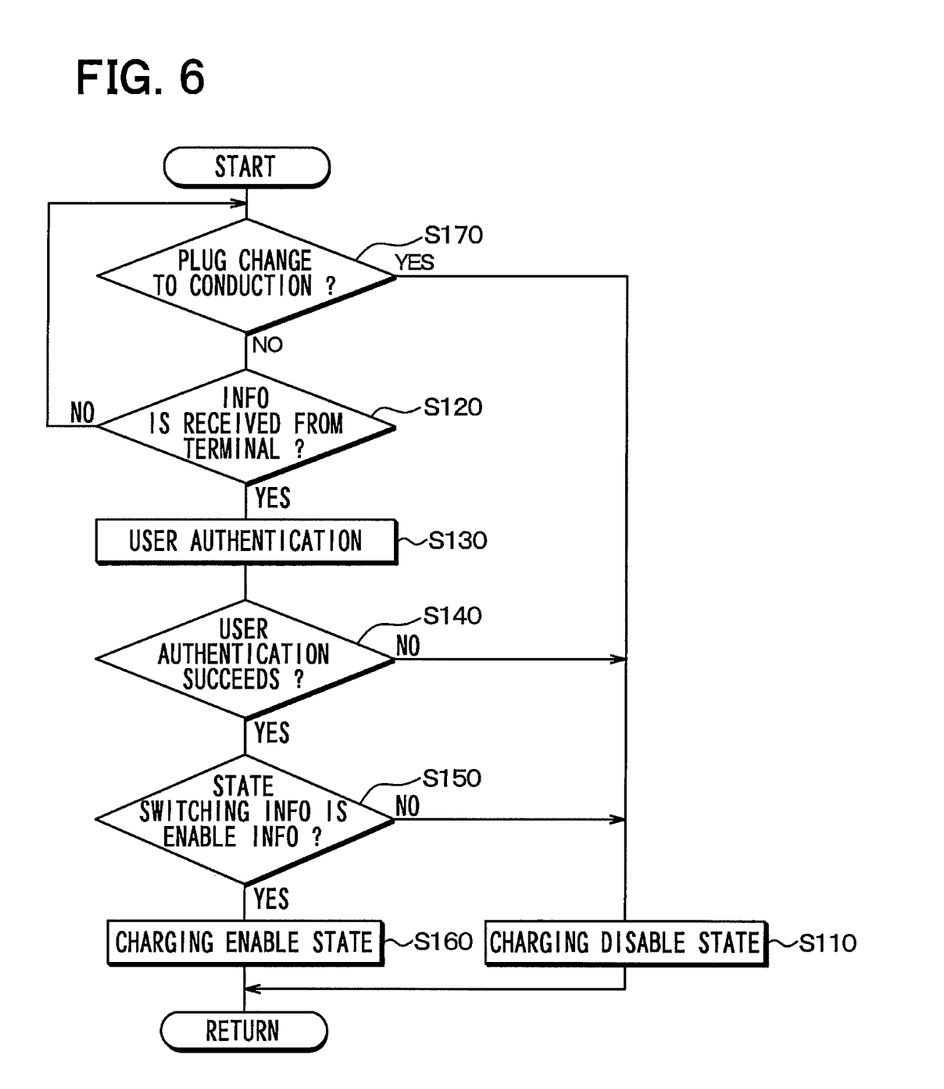
FIG. 6 is a flowchart of a function restriction process according to the second embodiment.

As shown in FIG. 6, the function restriction process starts at S170 where the control section 337 determines whether the connection state between the connection plug 31 and the external power source 5 changes from a non-conduction state to a conduction state. Specifically, at S170, the control section 337 determines whether the monitor signal inputted from the power supply monitor 333 indicates that interruption of power supply from the external power source 5 remains removed (e.g., the supply voltage is greater than zero).

In a situation where the connection plug 31 becomes connected to the receptacle outlet 50 of the external power source 5, the charging cable 3 will be used by a user such as an owner of the charging cable 3, but there is some possibility that the charging cable 3 may be used by others who don't have authority to use the charging cable 3.

For this reason, if the control section 337 determines that the connection state between the connection plug 31 and the external power source 5 changes from a non-conduction state to a conduction state corresponding to YES at S170, the function restriction process proceeds to S110 where the control section 337 puts the charging cable 3 into the charging disable state to restrict the function of the charging cable 3.

In contrast, if the control section 337 does not determine that the connection state between the connection plug 31 and the external power source 5 changes from a non-conduction state to a conduction state corresponding to NO at S170, the function restriction process proceeds to S120. At S120, the control section 337 determines whether the control section 337 receives the state switching information and the user identifying information from the information terminal 7.

If the control section 337 does not receive the state switching information and the user identifying information from the information terminal 7 corresponding to NO at S120, the function restriction process returns to S100. In contrast, if the control section 337 receives the state switching information and the user identifying information from the information terminal 7 corresponding to YES at S120, the function restriction process proceeds to S130 where the control section 337 performs the user authentication based on the user identifying information received from the information terminal 7. Then, the function restriction process proceeds to S140 where the control section 337 determines whether the user authentication succeeds or fails. If the user authentication fails corresponding to NO at S140, the control section 337 determines that the user authentication is performed unrightfully by others who don't have authority to use the charging cable 3, and the function restriction process proceeds to S110 where the control section 337 puts the charging cable 3 into the charging disable state.

In contrast, if the user authentication succeeds corresponding to YES at S140, the control section 337 determines that the user authentication is performed rightfully by a user who has authority to use the charging cable 3 and may be an owner of the charging cable 3, and the function restriction process proceeds to S150. At S150, the control section 337 determines whether the state switching information is the enable information to enable the charging of the assembled battery 11.

If the state switching information is the enable information corresponding to YES at S150, the function restriction process proceeds to S160 where the control section 337 puts the charging cable 3 into the charging enable state to unrestrict the function of the charging cable 3. In contrast, if the state switching information is the disable information corresponding to NO at S150, the function restriction process proceeds to S110 where the control section 337 puts the charging cable 3 into the charging disable state.

As described above, in the function restriction process according to the second embodiment, the charging cable 3 is put into the charging enable state only when both of the following conditions are met: the user authentication succeeds, and the state switching information is the enable information.

In contrast, the charging cable 3 is put into the charging disable state when at least one of the following conditions is met: the connection state between the connection plug 31 and the external power source 5 changes from a non-conduction state to a conduction state, the user authentication fails, and the state switching information is the disable information.

Returning to FIG. 5, if the control section 337 determines that the charging cable 3 is in the charging disable state corresponding to NO at S12, the charging start process proceeds to S11 where the control section 337 turns OFF the relay 330 through the relay driver 331.

In contrast, if the control section 337 determines that the charging cable 3 is in the charging enable state corresponding to YES at S12, the charging start process proceeds to S13. At S13, the control section 337 determines whether the charging connector 30 and the inlet 10 of the electric vehicle 1 are in a conduction state based on the conduction signal from the connection detection circuit 30a of the charging connector 30.

If the control section 337 determines that the charging connector 30 and the inlet 10 of the electric vehicle 1 are in a non-conduction state corresponding to NO at S13, the charging start process proceeds to S11 where the control section 337 turns OFF the relay 330 through the relay driver 331.

In contrast, if the control section 337 determines that the charging connector 30 and the inlet 10 of the electric vehicle 1 are in a conduction state corresponding to YES at S13, the charging start process proceeds to S14 where the control section 337 outputs the pilot signal to the electric vehicle 1 to notify the vehicle controller 13c that the charging start condition is met. After S14, the charging start process proceeds to S15 where the control section 337 determines whether the control section 337 receives the charging start signal from the electric vehicle 1.

If the control section 337 receives the charging start signal from the electric vehicle 1 corresponding to YES at S15, the charging start process proceeds to S16 where the control section 337 turns ON the relay 330 through the relay driver 331. As a result, power supply from the external power source 5 to the assembled battery 11 of the electric vehicle 1 is started so that the charging of the assembled battery 11 can be started.

As described above, according to the second embodiment, when the connection state between the connection plug 31 and the receptacle outlet 50 of the external power source 5 changes from a non-conduction state to a conduction state, the control section 337 puts the charging cable 3 into the charging disable state to restrict the function of the charging cable 3 so that the charging of the assembled battery 11 can be disabled.

In such an approach, even when the charging cable 3 is stolen by others who don't have author to use the charging cable 3, the charging cable 3 remains in the charging disable state so that others cannot use the function of the charging cable 3. That is, since it is hardly worth stealing the charging cable 3, others are deterred from stealing the charging cable 3.

Further, according to the second embodiment, when the connection state between the connection plug 31 and the external power source 5 changes from a non-conduction state to a conduction state, the charging cable 3 is automatically put into the charging disable state. In this way, the configuration according to the second embodiment does not require a user to do troublesome procedures to put the charging cable 3 into the charging disable state, compared to a conventional configuration where the charging cable 3 is put into the charging disable state whenever the charging cable 3 is disconnected from the electric vehicle 1.

Thus, the charging cable 3 is convenient for a user and less likely to be stolen by others.

Further, a user can put the charging cable 3 into either the charging enable state or the charging disable state by performing the user authorization with the information terminal 7. Thus, the configuration according to the second embodiment does not require a user to do troublesome procedures to use the charging cable 3 while effectively preventing the charging cable 3 from being unrightfully used by others.

Further, the charging cable 3 does not the battery 334 as an auxiliary power storage device. Accordingly, it is possible to reduce the number of parts of the charging cable 3 so as to reduce the cost of the charging cable 3.

Further, the charging start process and the function restriction process performed by the control section 337 according to the second embodiment can be performed by the charging cable 3 which has the battery 334 as described in the first embodiment.

(Modification)

While the present disclosure has been described with reference to the embodiments, it is to be understood that the disclosure is not limited to the embodiments. The present disclosure is intended to cover various modifications and equivalent arrangements within the spirit and scope of the present disclosure. For example, the embodiments can be modified as follows.

(1) In the embodiments, the charging cable 3 has the wireless communication module 336 and receives various types of information from the information terminal 7 through the wireless communication module 336. Instead of or in addition to the wireless communication module 336, the charging cable 3 can have a wired communication module capable of being connected wired to the information terminal 7. In this case, the charging cable 3 can receive information from the information terminal 7 through the wired communication module.

(2) In the embodiments, a user inputs various types of information including the user identifying information as a command into the charging cable 3 through the information terminal 7. Alternatively, the charging cable 3 can have an input section through which a user can input the command into the charging cable 3.

(3) In the embodiments, the charging cable 3 has a user authentication function. Instead of or in addition to the charging cable 3, the electric vehicle 1 can have a user authentication function. In this case, the user authentication can be performed through communication between the charging cable 3 and the electric vehicle 1.

(4) In the embodiments, the charging function of the charging cable 3 is restricted in a situation where the charging cable 3 may be stolen. The charging cable 3 can be provided with a warning device, such as a LED, a display unit, a buzzer, etc. to produce an alarm in such a situation.

For example, when the charging cable 3 is in the charging disable state, a warning message and/or image indicating that the charging cable 3 is in the charging disable state can be displayed on the display unit. In such an approach, the charging cable 3 is more convenient for a user and much less likely to be stolen. Further, for example, when the user authentication fails, the buzzer can produce an audible alarm. In such an approach, the charging cable 3 is much less likely to be stolen.

(5) In the embodiments, the control section 337 performs the charging start process and the function restriction process separately. Alternatively, the control section 337 performs the charging start process and the function restriction process together. For example, the control section 337 can perform the function restriction process before S12 of the charging start process.

(6) In the embodiments, in the charging start process, a step (i.e., S12) of determining whether the charging cable 3 is in the charging enable state is performed after a step (i.e., S13) of determining whether the charging connector 30 and the inlet 10 of the electric vehicle 1 are in a conduction state. Alternatively, for example, the step of determining whether the charging cable 3 is in the charging enable state can be performed before the step of determining whether the charging connector 30 and the inlet 10 of the electric vehicle 1 are in a conduction state.

(7) In the embodiments, when it is determined at S140 that the user authentication fails, the charging cable 3 is put into the charging disable state. Alternatively, for example, when it is determined at S140 that the user authentication fails, a step of prompting a user to input the user identifying information again can be performed before the charging cable 3 is put into the charging disable state.

In the embodiments, a user can put the charging cable 3 into either the charging enable state or the charging disable state by performing the user authentication through the information terminal 7. Alternatively, for example, a user can put the charging cable 3 into the charging enable state only by performing the user authentication through the information terminal 7.

In the embodiments, the connection determinator 337a, the authenticator 337b, and the switcher 337c are implemented by the single control section 337. Alternatively, at least one of the connection determinator 337a, the authenticator 337b, and the switcher 337c can be implemented by a control section other than the control section 337. For example, each of the connection determinator 337a, the authenticator 337b, and the switcher 337c can be implemented by a separate control section.

In the embodiments, the charging cable 3 according to the present disclosure is used in the electric vehicle 1. Alternatively, the charging cable 3 can be used in another type of vehicle which has an electric power storage device capable of being charged with electric power from an external power source. For example, the charging cable 3 can be used in a vehicle which runs on an internal combustion engine.

Such changes and modifications are to be understood as being within the scope of the present invention as defined by the appended claims.

What is claimed is:

1. A charging cable adapted to be detachably connected to a vehicle and an external power source to charge an electric power storage device mounted on the vehicle with electric power from the external power source, the charging cable comprising:
    a switcher that switches the charging cable between a charging enable state where a charging of the electric power storage device is enabled and a charging disable state where the charging of the electric power storage device is disabled;
    a connection plug adapted to be detachably connected to the external power source,
    a connection determinator that determines whether a connection state between the connection plug and the external power source changes between a conduction state and a non-conduction state,
    an information receiver that receives user identifying information and state switching information from an information terminal operated by a user, and
    an authenticator that performs user authentication by checking the user identifying information received from the information terminal against preregistered user identifying information,
    wherein
    the switcher puts the charging cable into the charging enable state in response to (i) a command from the user, (ii) the authenticator successfully authenticating the user, and (iii) the state switching information being enable information to enable the charging of the electric power storage device,
    the switcher puts the charging cable into the charging disable state, regardless of manipulation of the switcher by a user, in response to the connection determinator determining that the connection state changes from one of the conduction state and the non-conduction state to the other of the conduction state and the non-conduction state,
    the switcher maintains the charging cable in the charging disable state when the connection state between the connection plug and the external power source is the conduction state until (iv) the command is received from the user, (v) the authenticator successfully authenticates the user, and (vi) and the state switching information is enable information to enable the charging of the electric power storage device.

2. The charging cable according to claim 1, wherein the switcher puts the charging cable into the charging disable state in response to determination of the connection determinator that the connection state changes from the conduction state to the non-conduction state.

3. The charging cable according to claim 1, further comprising:
    an auxiliary electric power storage device that stores electric power, wherein
    the switcher uses the electric power stored in the auxiliary electric power storage device to put the charging cable into the charging disable state in response to determination of the connection determinator that the connection state changes from the conduction state to the non-conduction state.

4. The charging cable according to claim 1, wherein the switcher puts the charging cable into the charging disable state in response to determination of the connection determinator that the connection state changes from the non-conduction state to the conduction state.

5. The charging cable according to claim 4, wherein the switcher uses the electric power from the external power source to put the charging cable into the charging disable state in response to determination of the connection determinator that the connection state changes from the non-conduction state to the conduction state.

6. The charging cable according to claim 1, wherein the switcher puts the charging cable into the charging disable state when the user authentication succeeds and the state switching information is disable information to disable the charging of the electric power storage device.

7. The charging cable according to claim 1, wherein the connection determinator causes the switcher to put the charging cable into the charging disable state in response to determination of the connection determinator that the connection state changes from one of the conduction state and the non-conduction state to the other of the conduction state and the non-conduction state.

8. The charging cable according to claim 1, wherein the switcher, after putting the charging cable into the charging disable state, maintains the charging cable in the charging disable state further in response to determination of the connection determinator that the connection state returns from the other of the conduction state and the non-conduction state to the one of the conduction state and the non-conduction state.

9. The charging cable according to claim 1, the switcher, after putting the charging cable into the charging disable state, maintains the charging cable in the charging disable state further in response to determination of the connection determinator that the connection state returns from the other of the conduction state and the non-conduction state to the one of the conduction state and the non-conduction state, unless the user authentication succeeds and the state switching information is enable information to enable the charging of the charging of the electric power storage device.

10. The charging cable according to claim 1, wherein the connection determinator determines that the connection state changes from the conduction state to the non-conduction state in response to that a signal indicative of a supply voltage of the electric power from the external power source changes to indicate that the electric power is interrupted.

11. A charging cable adapted to be detachably connected to a vehicle and an external power source to charge an electric power storage device mounted on the vehicle with electric power from the external power source, the charging cable comprising:
a switcher that switches the charging cable between a charging enable state where a charging of the electric power storage device is enabled and a charging disable state where the charging of the electric power storage device is disabled;
a connection plug adapted to be detachably connected to the external power source, and
a connection determinator that determines whether a connection state between the connection plug and the external power source changes between a conduction state and a non-conduction state,
an information receiver that receives user identifying information and state switching information from an information terminal operated by a user, and
an authenticator that performs user authentication by checking the user identifying information received from the information terminal against preregistered user identifying information,
wherein
the switcher puts the charging cable into the charging enable state in response to (i) a command from the user, (ii) the authenticator successfully authenticating the user, and (iii) the state switching information being enable information to enable the charging of the electric power storage device,
the switcher puts the charging cable into the charging disable state, regardless of manipulation of the switcher by a user, in response to the connection determinator determining that the connection state changes from one of the conduction state and the non-conduction state to the other of the conduction state and the non-conduction state,
the connection determinator causes the switcher to put the charging cable into the charging disable state in response to the connection determinator determining that the connection state changes from one of the conduction state and the non-conduction state to the other of the conduction state and the non-conduction state, and
the switcher maintains the charging cable in the charging disable state when the connection state between the connection plug and the external power source is the conduction state until (iv) the command is received from the user, (v) the authenticator successfully authenticates the user, and (vi) and the state switching information is enable information to enable the charging of the electric power storage device.

12. The charging cable according to claim 1, further comprising a control section having a microcomputer and including the connection determinator and the switcher.

13. The charging cable according to claim 11, further comprising a control section having a microcomputer and including the connection determinator and the switcher.

14. A charging cable adapted to be detachably connected to a vehicle and an external power source to charge an electric power storage device mounted on the vehicle with electric power from the external power source, the charging cable comprising:
a connection plug adapted to be detachably connected to the external power source; and
a control section having a microcomputer and including a switcher, a connection determinator, an information receiver, and an authenticator, wherein the switcher switches the charging cable between a charging enable state where a charging of the electric power storage device is enabled and a charging disable state where the charging of the electric power storage device is disabled, and the connection determinator determines whether a connection state between the connection plug and the external power source changes between a conduction state and a non-conduction state, wherein the information receiver receives user identifying information and state switching information from an information terminal operated by a user, and wherein the authenticator performs user authentication by checking the user identifying information received from the information terminal against preregistered user identifying information; and
wherein:
the switcher puts the charging cable into the charging enable state in response to a command from the user, (ii) the authenticator successfully authenticating the user, and (iii) the state switching information being enable information to enable the charging of the electric power storage device,
the switcher puts the charging cable into the charging disable state, regardless of manipulation of the switcher by a user, in response to the connection determinator determining that the connection state changes from one of the conduction state and the non-conduction state to the other of the conduction state and the non-conduction state, and
the switcher maintains the charging cable in the charging disable state when the connection state between the connection plug and the external power source is the conduction state until (iv) the command is received from the user, (v) the authenticator successfully authenticates the user, and (vi) and the state switching information is enable information to enable the charging of the electric power storage device.

15. The charging cable according to claim 1, further comprising:
a control section having a microcomputer and including the connection determinator and the switcher;
wherein:
in response to determination of the connection determinator that the connection state changes from the conduction state to the non-conduction state, the control section sets a charge flag to a first state corresponding to the charging disable state,
in response to successful authentication of user identifying information received by an the information receiver from the information terminal and to the state switching information corresponding to enable information to enable the charging of the electric power storage device being received by the information receiver from the information terminal, the control section sets the charge flag to a second state corresponding to the charging enable state, and the control section outputs a control signal to a relay driver to drive a relay to an off state whereby delivery of electric power from the external power source to the vehicle is prevented in response to the charge flag being set to the first state and to drive the relay to an on state whereby electric power is supplied from the external power source to the vehicle in response to the charge flag being set to the second state.

16. The charging cable according to claim 15, wherein the information terminal is a mobile phone.

17. The charging cable according to claim 1, further comprising:
- a control section having a microcomputer and including the connection determinator and the switcher;
- a relay having an on state whereby electric power is supplied from the external power source to the vehicle and an off state whereby delivery of electric power from the external power source to the vehicle is prevented;
- a relay driver that switches the relay between the on state and the off state based on a control signal from the control section;

wherein:

in response to determination of the connection determinator that the connection state changes from the conduction state to the non-conduction state, the control section sets a charge flag to a first state corresponding to the charging disable state, in response to the authentication by the authenticator succeeding and the state switching information received by the information receiver being disable information, the control section sets the charge flag to the first state corresponding to the charging disable state, in response to the authentication by the authenticator succeeding and the state switching information received by the information receiver being enable information, the control section sets the charge flag to a second state corresponding to the charging enable state, and the control section outputs the control signal to the relay driver to drive the relay to the off state in response to the charge flag being set to the first state corresponding to the charging disable state and to drive the relay to the on state in response to the charge flag being set to the second state corresponding to the charging enable state.

18. The charging cable according to claim 17, wherein the information terminal is a mobile phone.

* * * * *